US012640057B2

(12) United States Patent
Knothe Tate et al.

(10) Patent No.: US 12,640,057 B2
(45) Date of Patent: May 26, 2026

(54) DYNAMIC BODY PART SIMULATOR

(71) Applicant: BIOCONIX PTY LTD, Wentworth Falls (AU)

(72) Inventors: Melissa L. Knothe Tate, Wentworth Falls (AU); Matthew Lim, Wentworth Falls (AU)

(73) Assignee: BIOCONIX PTY LTD., Wentworth Falls (AU)

( * ) Notice: Subject to any disclaimer, the term of this patent is extended or adjusted under 35 U.S.C. 154(b) by 403 days.

(21) Appl. No.: 18/556,779

(22) PCT Filed: Apr. 22, 2022

(86) PCT No.: PCT/IB2022/053790
§ 371 (c)(1),
(2) Date: Oct. 23, 2023

(87) PCT Pub. No.: WO2022/224220
PCT Pub. Date: Oct. 27, 2022

(65) Prior Publication Data
US 2024/0212526 A1      Jun. 27, 2024

Related U.S. Application Data

(60) Provisional application No. 63/178,262, filed on Apr. 22, 2021.

(51) Int. Cl.
*G09B 23/32*        (2006.01)
*G01L 5/00*          (2006.01)

(52) U.S. Cl.
CPC ............ *G09B 23/32* (2013.01); *G01L 5/0028* (2013.01); *G01L 5/0061* (2013.01)

(58) Field of Classification Search
CPC ..... G09B 23/32; G01L 5/0028; G01L 5/0061; A61F 2240/008; A61F 13/08; A61B 5/1073; A61B 5/4878; A61B 2017/00716; A41H 43/00; A61H 15/00
See application file for complete search history.

(56) References Cited

U.S. PATENT DOCUMENTS

| | | | |
|---|---|---|---|
| 4,282,638 A | 8/1981 | Christ et al. | |
| 4,363,383 A | 12/1982 | Rogier | |
| 4,417,401 A * | 11/1983 | Aisaka | A41H 1/00 |
| | | | 33/561.1 |
| 6,334,363 B1 * | 1/2002 | Testud | A61F 13/08 |
| | | | 73/862.046 |
| 8,419,437 B2 * | 4/2013 | Wesp | A61F 13/085 |
| | | | 434/262 |

FOREIGN PATENT DOCUMENTS

| | | |
|---|---|---|
| CN | 210674020 U | 1/2020 |
| CN | 211986246 U | 11/2020 |

* cited by examiner

*Primary Examiner* — Jonathan M Dunlap
(74) *Attorney, Agent, or Firm* — Tarolli, Sundheim, Covell & Tummino LLP

(57) ABSTRACT

An apparatus for simulating a body part includes a base and an actuator connected to the base. Rotors are rotatable about an axis in response to actuation of the actuator. Each rotor includes radially extending slots. Flanges are circumferentially arranged about the rotor. Each flange includes actuating pistons slidably received in the slots of the rotors such that the flanges are moved radially relative to the axis in response to actuation of the actuator to vary a volume defined by the flanges and thereby simulate body part expansion.

22 Claims, 19 Drawing Sheets

DYNAMIC BODY PART SIMULATOR

RELATED APPLICATION

This application claims priority from U.S. Provisional Application No. 63/178,262, filed Apr. 22, 2021, the subject matter of which is incorporated herein its reference in their entirety.

TECHNICAL FIELD

The present invention relates generally to body part simulation and, in particular, relates to an apparatus, system, and method for dynamically simulating body part expansion and contraction.

BACKGROUND

Currently, patients with oedema must travel to medical and/or physical therapy clinics for regular assessment of oedema mitigation and sizing of compression garments. This presents a burden for patients, health care providers, and the health care system. To this end, there is a critical shortage of physical therapists in rural and remote regions of many parts of the world and/or in space environments. This lack of access to care for rural and/or remotely located patients is exacerbated by geographic distance to the nearest clinic, health restrictions, e.g., the COVID pandemic or compromised immune status, and/or other lack of access to health care resources.

When a patient in need of a compression garment does access a health care provider, the first step can involve being discharged from the hospital or clinic rooms following, for example, a skin graft, lymphedema diagnosis, etc. The patient then has an in-person physiotherapy consult in which the affected limb is measured and the appropriate compression garment sized. A follow-up, in-person physiotherapy consult occurs where the sized garment is fit and function tested. Additional limb measurement and refitting of the garment may be required multiple times if function is found to be insufficient.

SUMMARY

In one example, an apparatus for simulating a body part includes a base and an actuator connected to the base. Rotors are rotatable about an axis in response to actuation of the actuator. Each rotor includes radially extending slots. Flanges are circumferentially arranged about the rotor. Each flange includes actuating pistons slidably received in the slots of the rotors such that the flanges are moved radially relative to the axis in response to actuation of the actuator to vary a volume defined by the flanges and thereby simulate body part expansion.

In another aspect, taken alone or in combination with any other aspect, the slots extend radially and circumferentially relative to the axis.

In another aspect, taken alone or in combination with any other aspect, each of the actuating pistons includes a base and a projection extending from the base slidably received in one of the slots.

In another aspect, taken alone or in combination with any other aspect, a shaft is rigidly connected to the base and includes radially extending passages for slidably receiving the bases of the actuating pistons to prevent circumferential movement of the actuating pistons about the axis during rotation of the rotors.

In another aspect, taken alone or in combination with any other aspect, rotation of the rotors causes the projections to slide within the slots and the actuating pistons to slide within the passages to adjust the volume defined by the flanges.

In another aspect, taken alone or in combination with any other aspect, rotation of the rotors causes the projections to slide within the slots radially outward from the axis to thereby move the flanges radially outward from the axis.

In another aspect, taken alone or in combination with any other aspect, at least one pressure sensor is provided on each flange and configured to measure force exerted on the flanges by a compression sleeve extending over the flanges.

In another aspect, taken alone or in combination with any other aspect, the at least one pressure sensor includes multiple pressure sensors longitudinally aligned with one another along each flange.

In another aspect, taken alone or in combination with any other aspect, the flanges are configured to receive an expandable stent.

In another aspect, take alone or in combination with any other aspect, the flange is configured to receive a compression sleeve.

In another aspect, taken alone or in combination with any other aspect, the flanges are configured to receive body armor.

In another aspect, taken alone or in combination with any other aspect, the actuator includes a motor.

In another example, an apparatus for simulating a body part includes a base and a motor connected to the base. Rotors are rotatable about an axis in response to rotation of the motor. Each rotor includes radially extending slots. A shaft extends over the rotors and is connected to the base to prevent movement of the shaft relative to the rotors. The shaft includes radially extending passages. Flanges circumferentially arranged around the shaft. Each flange includes actuating pistons extending through the passages in the shaft and slidably received in the slots of the rotors. Rotation of the motor causes rotation of the rotors to move the actuating pistons through the slots to thereby vary a volume defined by the flanges and simulate body part expansion.

In another example, a method for simulating a body part includes providing an apparatus having flanges circumferentially arranged about an axis and a motor for adjusting a radial spacing between the flanges and the axis. A sleeve is positioned over the flanges. The motor is actuated to move the flanges radially outward to increase a volume defined by the flanges and thereby expand the sleeve.

In another aspect, taken alone or in combination with any other aspect, the sleeve comprises a compression sleeve.

In another aspect, taken alone or in combination with any other aspect, the sleeve comprises a stent.

In another aspect, taken alone or in combination with any other aspect, the sleeve comprises body armor.

In another aspect, taken alone or in combination with any other aspect, pressure sensors are provided on the flanges to monitor the forces applied by the sleeve to the flanges.

In another aspect, taken alone or in combination with any other aspect, the motor is actuated to move the flanges radially inward to decrease the volume defined by the flanges in an alternating manner with actuating the motor to move the flanges radially outward.

In another example, a system for simulating a body part includes an apparatus having a base and a motor connected to the base. Rotors are rotatable about an axis in response to actuation of the motor. Each rotor includes radially extending slots. Flanges are circumferentially arranged about the rotor. Each flange includes actuating pistons slidably received in the slots of the rotors such that the flanges are moved radially relative to the axis in response to actuation of the motor to vary a volume defined by the flanges and thereby simulate body part expansion and contraction. A controller controls actuation of the motor. A mobile device remotely acquires dimensions of a target body part used to control actuation of the motor. The flanges and parts can then be, for example, rapid prototyped specific to the patient.

In another example, a system is provided for actuating a physiotherapy ball to impart spatiotemporally varying displacements on the surface of a sphere or body that imparts a massage effect on the surface of the skin when a person places it between the skin and a surface.

The apparatus of the present invention allows for the volumetric simulation of one or more body parts, e.g., upper and/or lower arm, upper and/or lower leg, neck or chest cavity, as well as body part lumens, including vasculature. In one instance, the apparatus can simulate a phantom limb for testing the mechanoactive design and efficacy (e.g., structure-function) relationships of lymphedema compression sleeves by enabling controlled spatial and temporal changes in volume not possible in complex living systems or static mannequins/rigid body systems. The mobility and customization of the apparatus can allow for tailored compressive sleeves to be made for patients remotely and over time— without requiring multiple on-site visits and/or adjustments.

Prototype compression sleeves can be manufactured and integrated with motor control to control the displacement and/or force application in highly controlled spatiotemporal cycles. To this end, physiological testing scenarios can be defined and evaluated with ranges of displacements, expansions, and/or strain rates. Moreover, additional sensors such as temperature and humidity sensors can be incorporated into the apparatus to assess the affects of temperature, humidity, and environments on the prototype.

A modular design for the flanges allows the apparatus to be scaled and assess a wide range of compression sleeve prototypes for durability and life cycle metrics.

Other objects and advantages and a fuller understanding of the invention will be had from the following detailed description and the accompanying drawings.

DETAILED DESCRIPTION

Figure 1:
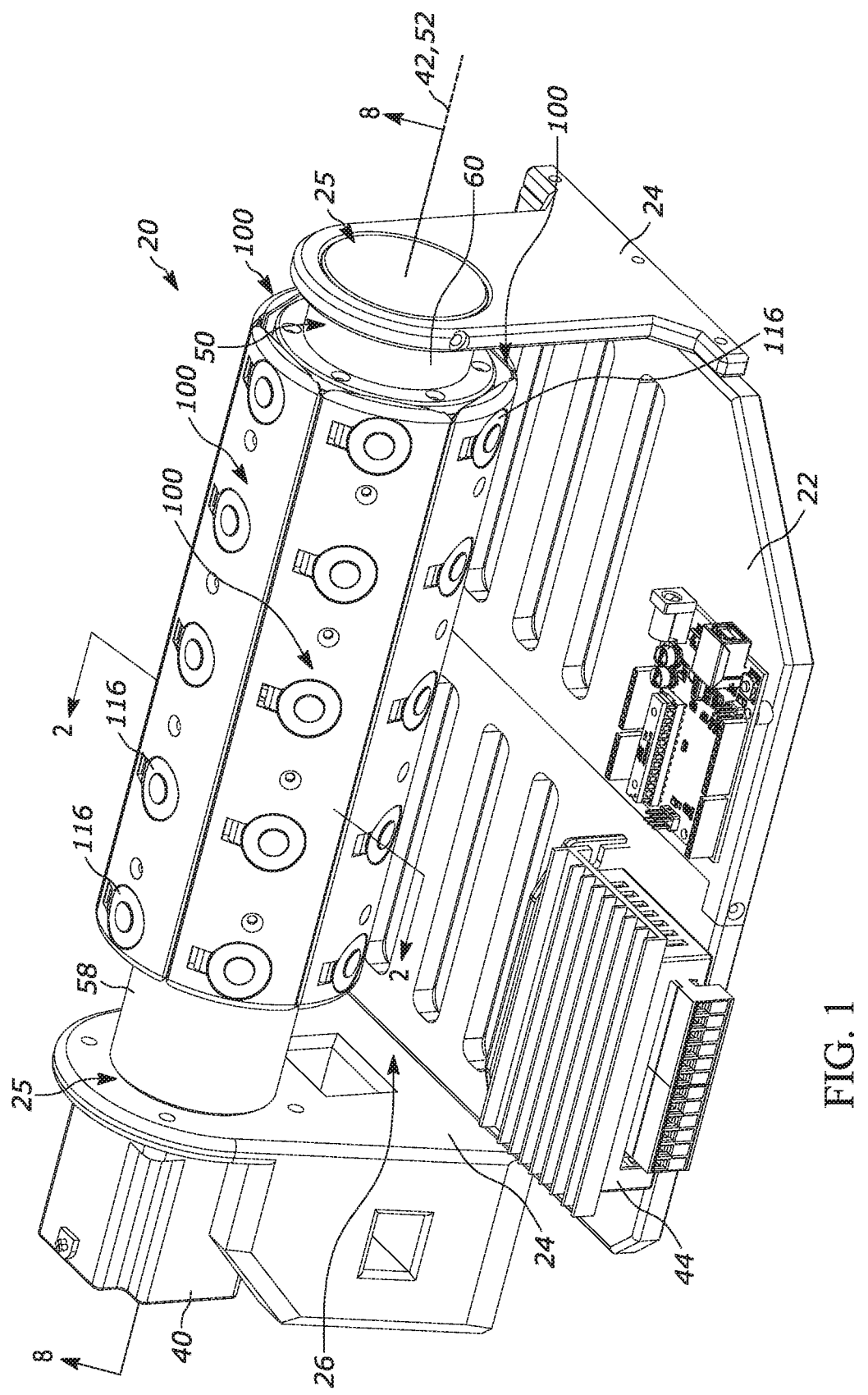
FIG. 1 is a schematic illustration of a body part simulation apparatus in accordance with an aspect of the present invention
Figure 2:
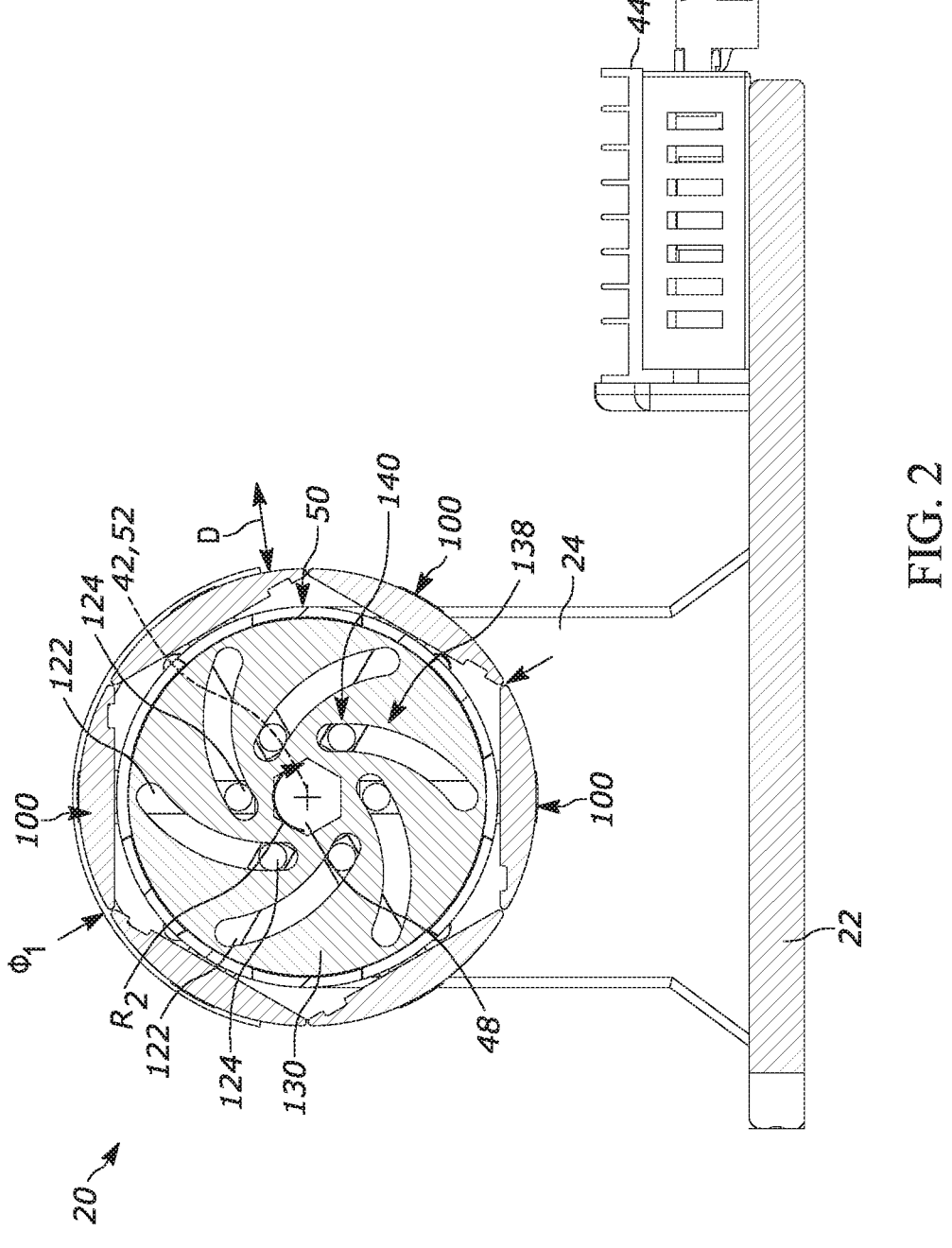
FIG. 2 is a side view of the apparatus of FIG. 1 in a first or retracted condition.

The present invention relates generally to body part simulation and, in particular, relates to an apparatus, system, and method for dynamically simulating body part expansion and contraction. FIGS. 1-2 illustrate a body part simulation apparatus 20 in accordance with an aspect of the invention. The apparatus 20 includes a base 22 having a pair of mounting arms 24 extending therefrom. Each mounting arm 24 includes an opening 25. The base 22 and mounting arms 24 cooperate to define a receiving space 26.

An actuator 40 is secured or connected to the base 22. The actuator 40 can be a rotary actuator (as shown), a linear actuator (not shown) or a radial actuator (in case of a spherical design, not shown). In the example shown, the actuator 40 is a motor having an output shaft rotatable about an axis 42. The motor 40 can be a step motor having, for instance, a 200 steps/revolution (1.8 degrees) resolution. Greater or lesser resolutions are also contemplated. The provision of a gear train, such as a planetary gear train (not shown) connected to the motor 40, is also contemplated for increasing the motor 40 output torque. In any case, a controller 44 is connected to the motor 40 to control actuation thereof.

Figure 3:
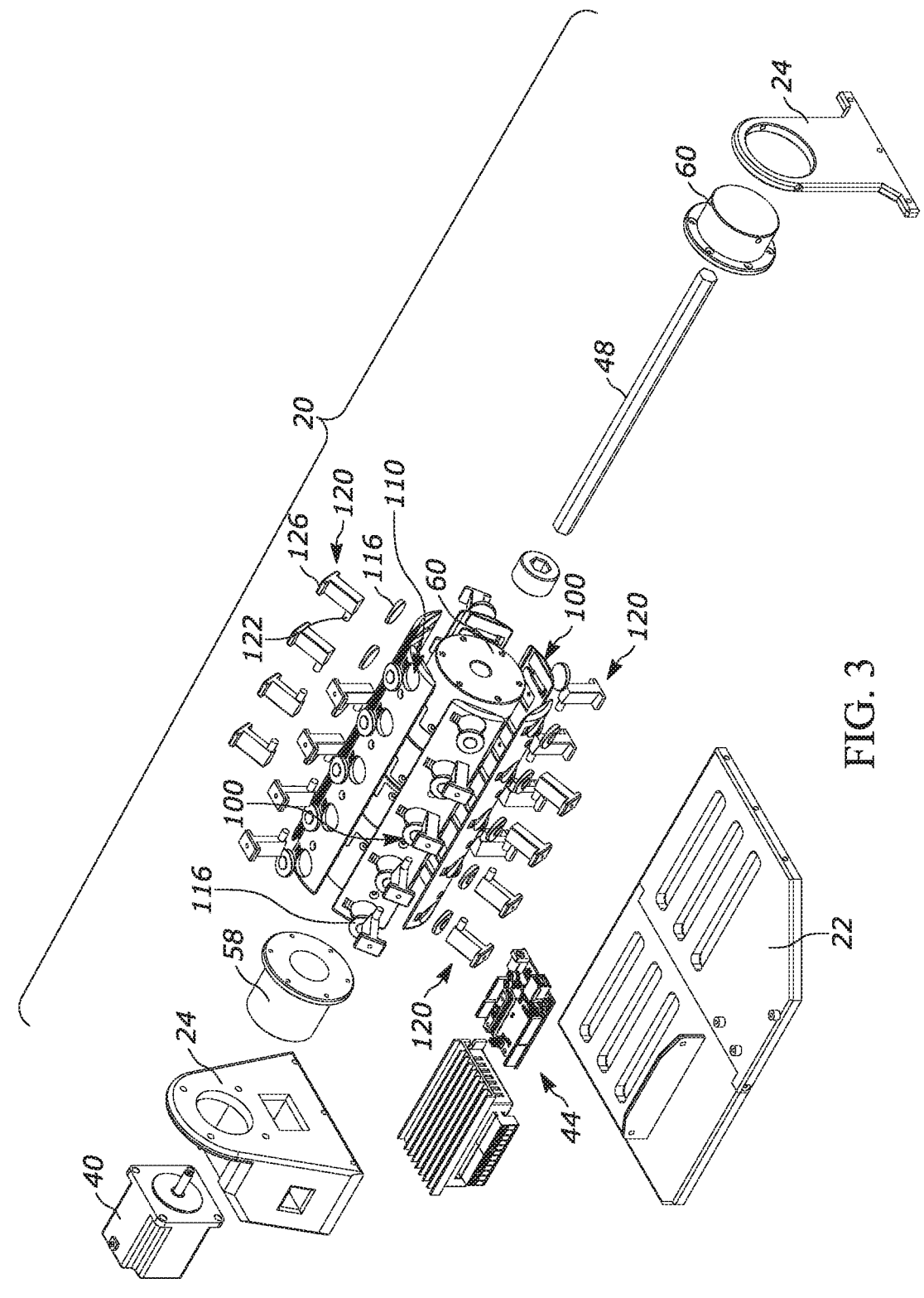
FIG. 3 is an exploded view of the apparatus of FIG. 1.
Figure 4A:
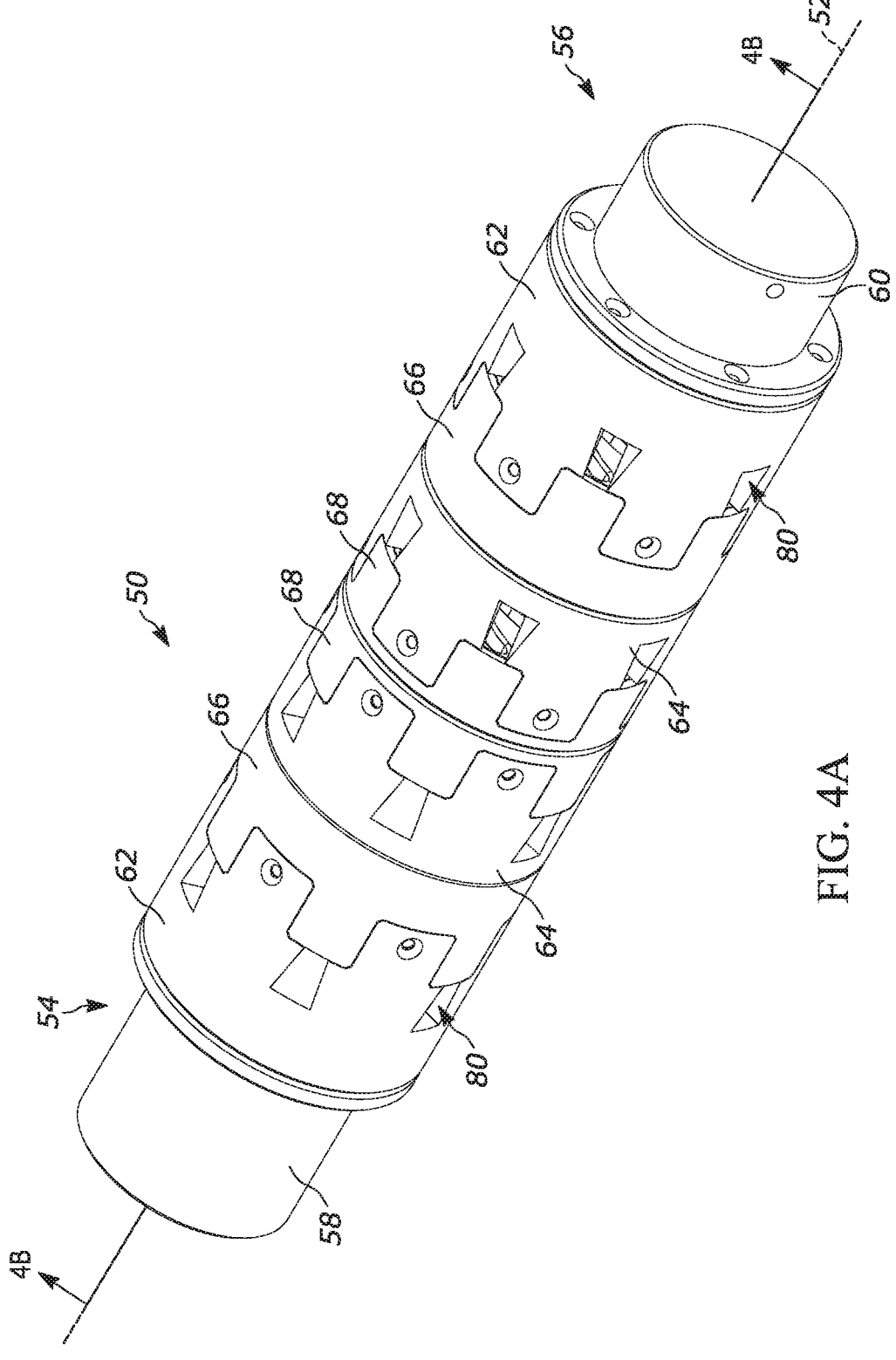
FIG. 4A is a schematic illustration of a shaft of the apparatus.

Referring to FIG. 3, a rod 48 is connected to the output shaft of the motor 40 and extends between the mounting arms 24. A shaft or sleeve 50 extends over the rod 48 and through the openings 25 in the mounting arms 24. More specifically, the shaft 50 extends longitudinally from a first end 52 secured to one of the mounting arms 24 to a second end 54 secured to the other of the mounting arms. The shaft 50 is connected to both mounting arms 24 in a manner, e.g., set screws, that prevents relative movement therebetween As shown in FIG. 4A, the shaft 50 includes a series of segmented parts secured to one another along a common centerline 52 aligned with the axis 42. In particular, the shaft 50 includes a pair of mounting brackets 58, 60 received in the openings 25 for fixing the shaft to the mounting arms. End piston holders 62 are provided between the mounting brackets 58, 60. Middle piston holders 64 are provided between the end piston holders 62. End coupling bodies 66 are positioned between the mounting brackets 58, 60 and the respective end piston holders 62. The end coupling bodies 66 can interdigitate with the mounting brackets 58, 60. Middle coupling bodies 68 are positioned between the middle piston holders 64 and can interdigitate therewith. That said, all the components 58, 60, 62, 64, 66, 68 are aligned along the centerline 52 and fixed together such that the shaft 50 is formed as a single, unitary component.

Figure 4B:
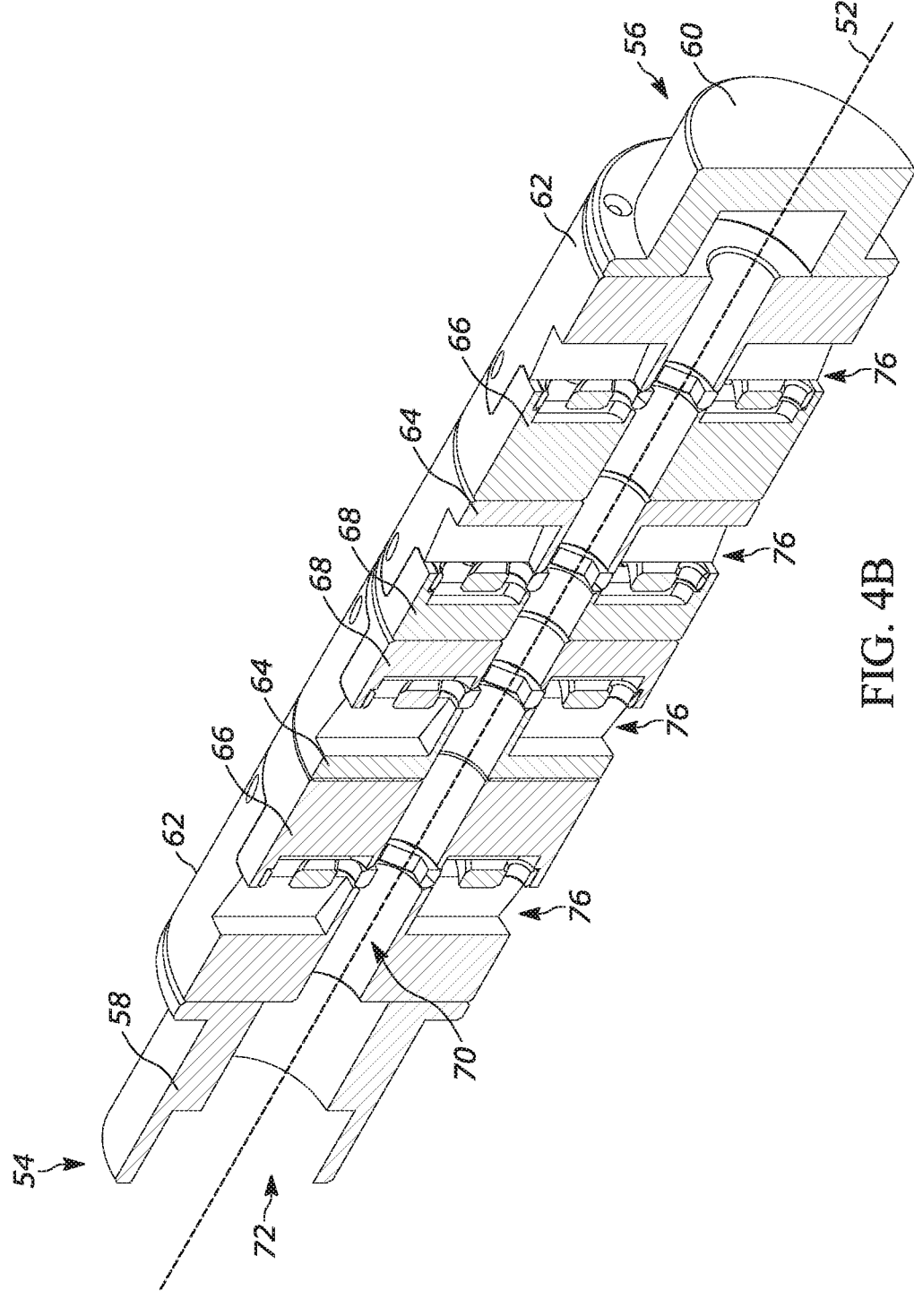
FIG. 4B is a section view taken along line 4B-4B of FIG. 4A.

Referring to FIG. 4B, a central passage 70 extends from an opening 72 in the mounting bracket 58 and along the centerline 52 towards the second end 56 of the shaft 50. The components 58, 60, 62, 64, 66, 68 are secured to one another such that longitudinal gaps 76 are formed between adjacent pairs of the components along the central passage 70.

Figure 4C:
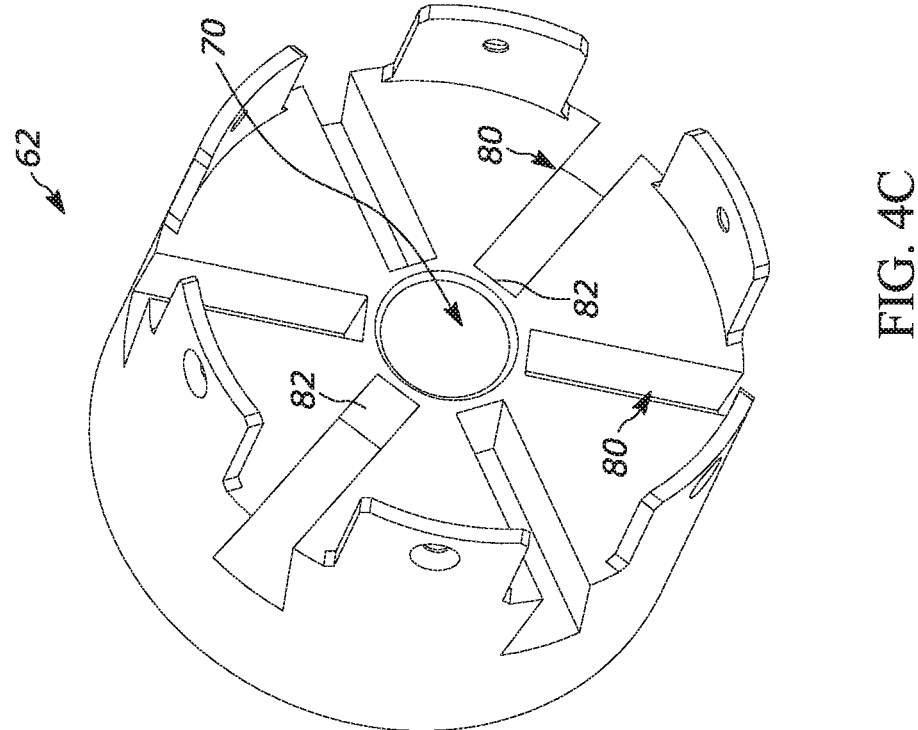
FIG. 4C is a perspective view of a piston holder of the shaft.

The piston holders 62, 64 are substantially identical to one another and, thus, a description of only one of the piston holders 62 is provided for brevity. Referring to FIG. 4C, the piston holder 62 is generally cylindrical with the central passage 70 extending through its center. Radial passages 80 extend from the periphery of the piston holder 62 towards the central passage 70. In one example, the radial passages 80 have a trapezoidal shape, although other shapes are contemplated, e.g., polygonal or round. The radial passages 80 terminate at end surfaces 82 spaced radially from the central passage 70. The radial passages 80 are symmetrically arranged about the central passage 70.

Returning to FIGS. 2-3, a series of flanges 100 is provided around the shaft 50, e.g., circumferentially arranged about the shaft. Although six flanges 100 are shown, it will be appreciated that more or fewer flanges can be arranged about the shaft 50. In any case, the flanges 100 can abut one another so as to completely encircle/enclose the shaft 50. Each flange 100 extends longitudinally in a direction parallel to the centerline 42 from a first end 102 to a second end 104. The length of the flange 100 is indicated at L (see FIG. 5A).

The flanges 100 shown are generally contoured to collectively define a cylinder when arranged around the shaft 50. It will be appreciated, however, that body parts in real life may not be perfectly cylindrical. That said, the flanges 100 can be contoured, e.g., tapered, shaped and/or otherwise configured, to more closely mimic a body part to be simulated (not shown).

Figure 5A:
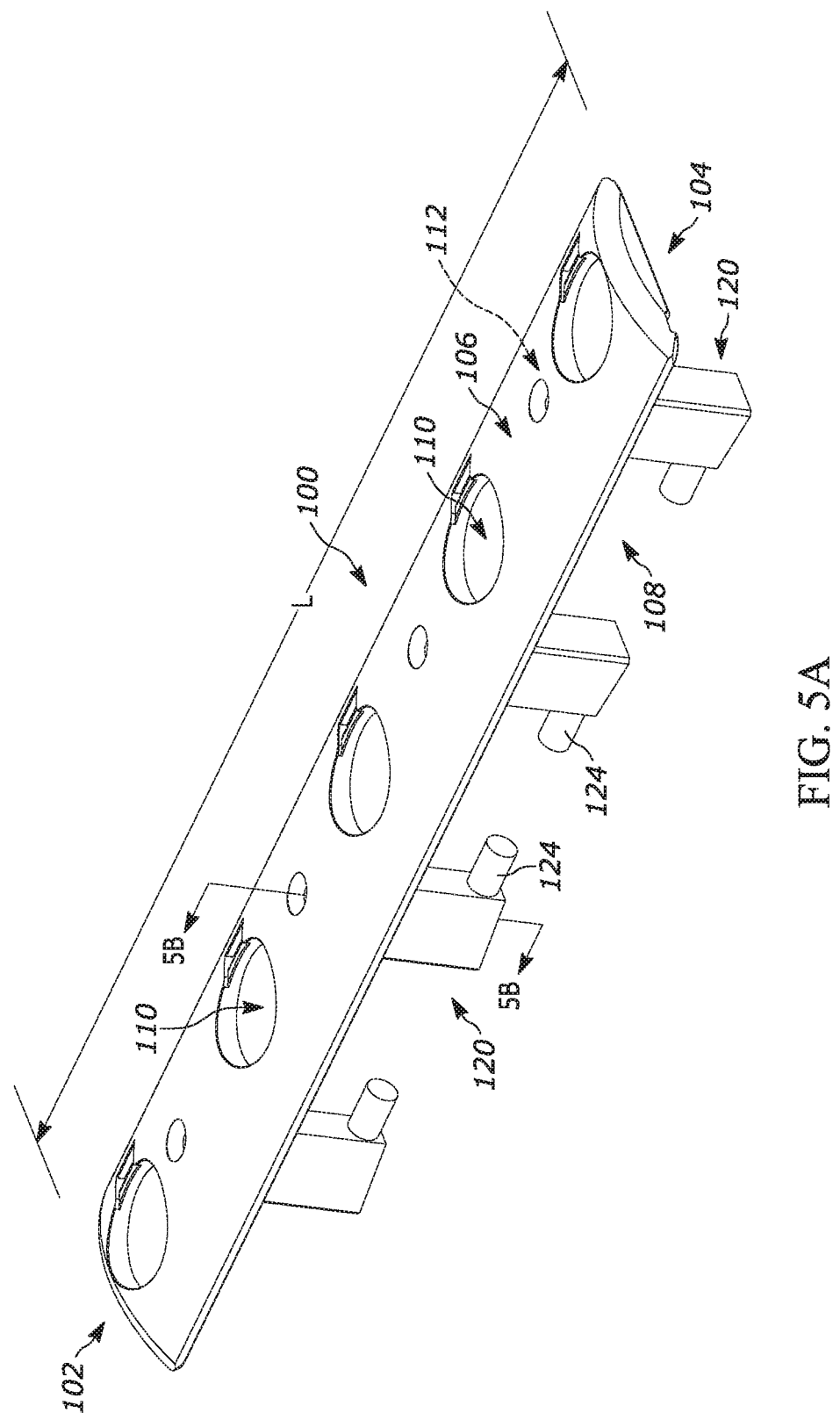
FIG. 5A is a schematic illustration of a flange of the apparatus.
Figure 5C:
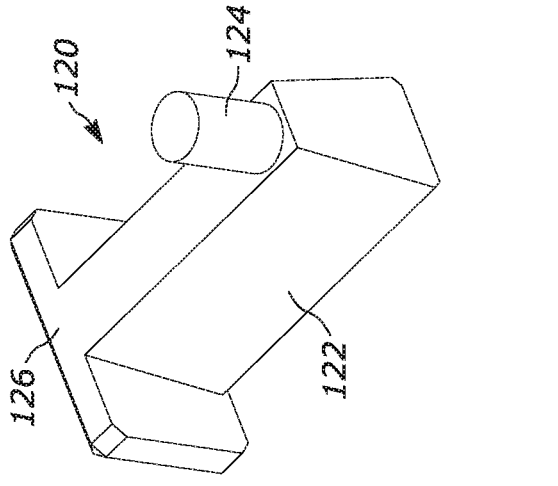
FIG. 5B is a section view taken along line 5B-5B of FIG. 5A.
Figure 5B:
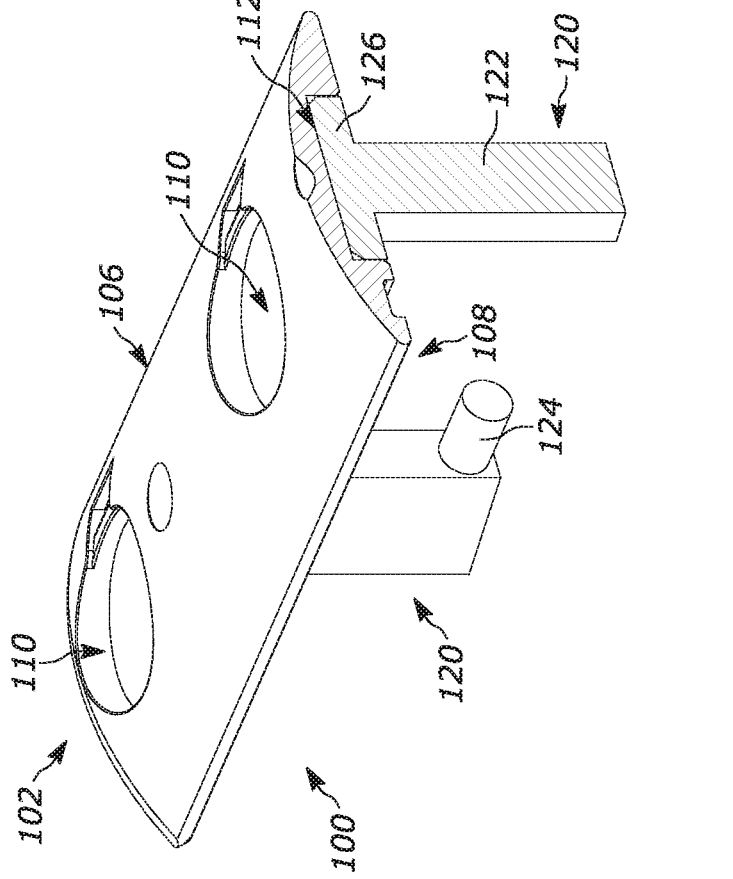

Referring further to FIGS. 5A-5B, each flange 100 has a first side 106 facing away from the shaft 50 and a second side 108 facing the shaft. One or more recesses or pockets 110 are formed in the first side 106 and extend towards the second side 108. The recesses 110 can be aligned with one another along the length L of the flange 100 (as shown) or misaligned from one another (not shown). One or more recesses or pockets 112 are also formed in the second side 108 and extend towards the first side 108. The recesses 112 are aligned with one another along the length L of the flange 100.

A pressure sensor 116 is provided within each recess 110 and connected with the controller 44 in a manner that allows for signals to be sent therebetween. The pressure sensor 116 can be, for example, a thin film pressure sensor.

Actuating pistons 120 are associated with each flange 100. Each actuating piston 120 includes a base 122 and a projection 124 extending from an end of the base (see FIG. 5C). As shown, the base 122 is substantially trapezoidal and the projection 124 is cylindrical. In any case, the base 122 has the same shape as the radial passages 126. A head 126 is provided at an end of the base 122 opposite the projection 124. The head 126 can extend substantially perpendicular to the base 122 and has the same shape as the recesses 112 in the flange 100.

The actuating pistons 120 are integrally formed with or rigidly fixed to the second sides 108 of the flanges 100 such that the flange and all actuating pistons associated therewith form a single, unitary component. As shown, the heads 126 of the actuating pistons 120 are received in and fixed relative to the recesses 112 in the second side 108 of the flange 100. The projections 124 closer to the first end 102 of the flange 100 extend towards the second end 104. The projections 124 closer to the second end 104 of the flange extend towards the first end 102.

Figure 6:
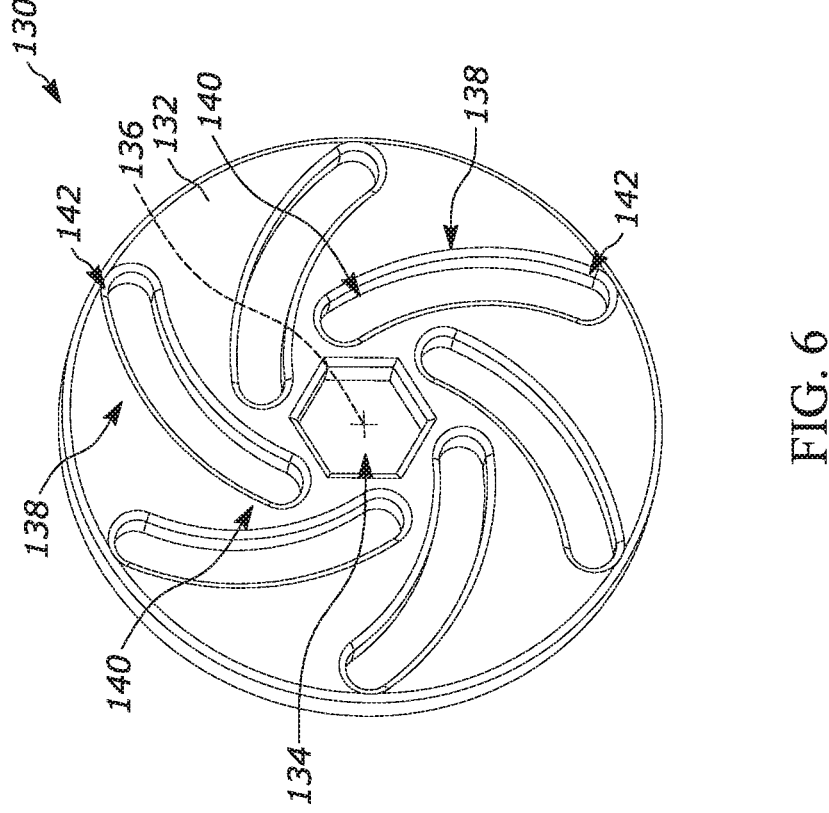
FIG. 6 is a schematic illustration of a rotor of the apparatus.

Returning to FIG. 3, rotors 130 are provided along the length of the rod 48 and coupled for rotation therewith. To this end, each rotor 130 includes a base 132 and a central passage 134 extending therethrough along a centerline 136 (see FIG. 6). The central passage 134 can have a polygonal shape keyed to the rod 48 to prevent relative rotation therebetween.

Slots 138 extend through the base 132 and are arranged about the central passage 134. Each slot 138 extends from a first end 140 positioned closer to the central passage 134 to a second end 142 positioned closer to the periphery of the base 132. In one example, the slots 138 extend both radially and circumferentially relative to the centerline 136. More specifically, each slot 138 can extend radially outward from the first end 140 and in a clockwise direction (as shown) relative to the central passage 134 until terminating at the second end 142. Regardless, the slots 140 have an arc-shaped or curved trajectory along the base 132. The curved trajectory of the slots 140 can be modified in length/radius to allow for different rates of translation from rotation to linear motion to the actuating pistons 160.

Figure 7:
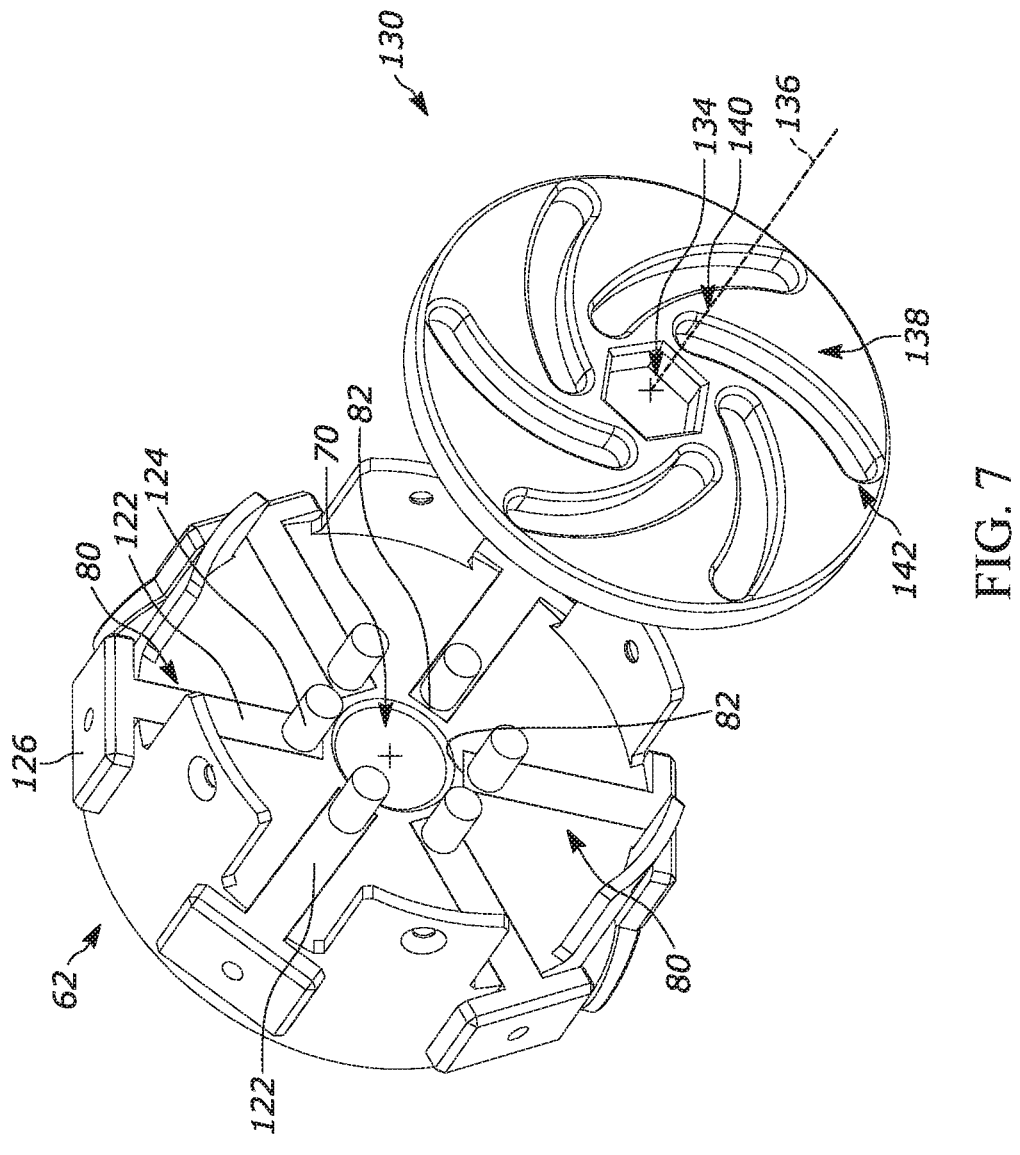
FIG. 7 is an exploded view of a portion of the apparatus.

The interrelation between the piston holder 62, the actuating pistons 120, and the rotor 130 is illustrated in FIG. 7. The bases 122 of the actuating pistons 120 are slidably received in the radial slots 80 of each piston holder 62 such that the projections 124 are positioned adjacent the end surfaces 82 and the heads 126 are positioned outside the radial passages 80. The heads 126 can abut the exterior of the piston holder 62. Each of the actuating pistons 120 shown in FIG. 7 corresponds with one of the flanges 100 provided about the shaft 50.

Figure 8:
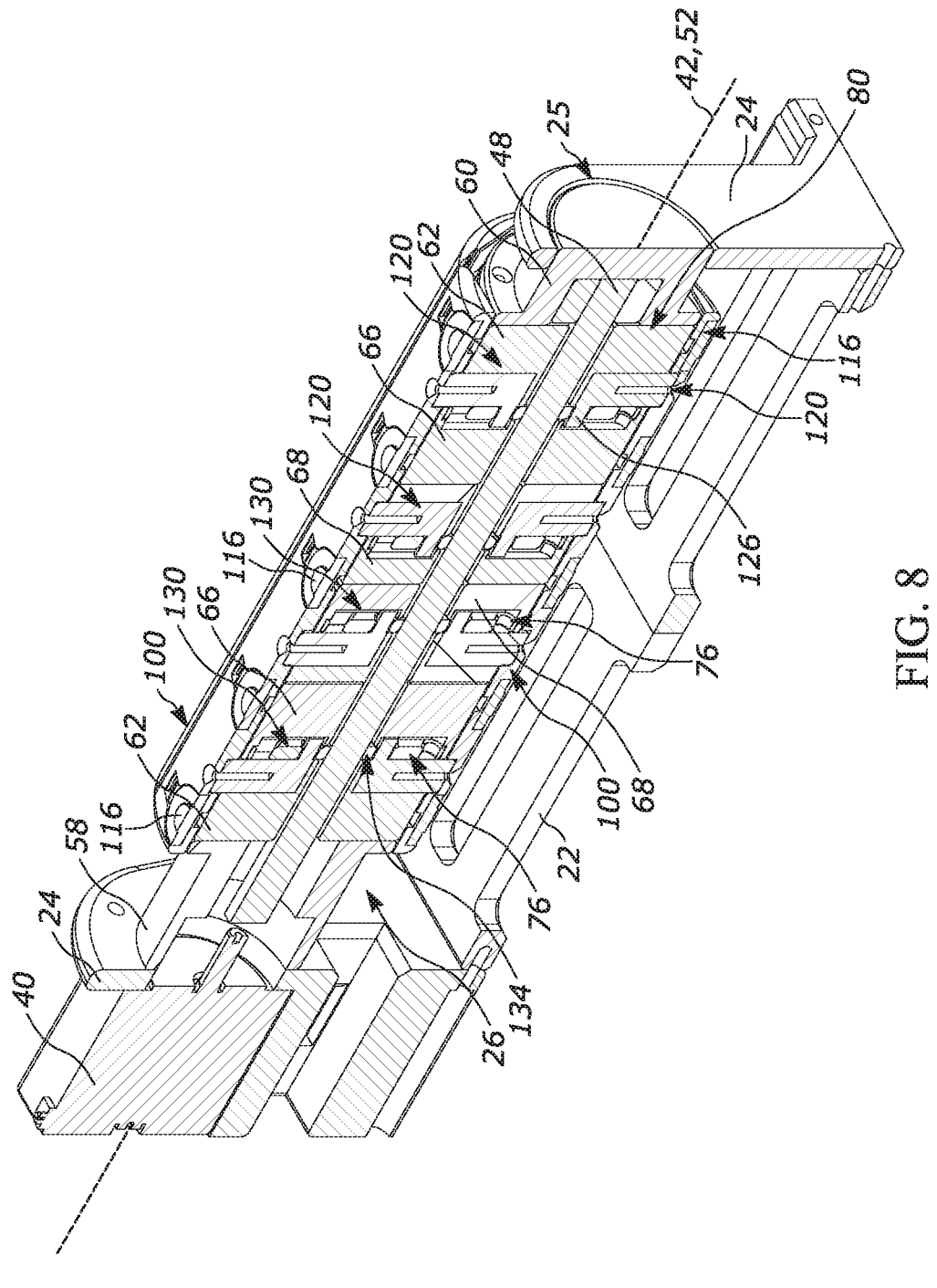
FIG. 8 is a section view taken along line 8-8 of FIG. 1.

When the apparatus 20 is assembled (see FIG. 8), the shaft 50 is secured to the mounting arms 24 as previously noted and extends through the receiving space 26. The rod 48 extends along the axis 42 and centerline 72 through the central passage 70 of the shaft 50. In this example, the axis 42 is coextensive with the centerline 52 of the shaft 50 but the two could be offset (not shown). The actuating pistons 120 are positioned in the radial openings 80 of all the piston holders 62, 64. Consequently, the piston holders 62, 64 cooperate to slidably receive the actuating pistons 120 associated with all the flanges 100.

The rotors 130 are provided in each of the gaps 76 between the components 62, 64, 66, 68 and are freely rotatable within the gaps. The central opening 134 in each rotor 130 is aligned with the central passage 70 in the piston holder 62. The projections 124 on the actuating pistons 120 extend into and are slidably received within the slots 138. The rod 48 extends through the central opening 134 of each rotor 130 and is fixed for rotation therewith. The flanges 100 are circumferentially arranged about the axis 42 and around the shaft 50.

Referring to FIGS. 1-2, the apparatus 20 has a first or contracted condition in which the motor 40 is not actuated and the flanges 100 have a first radial spacing from the axis 42 defining a contracted position. More specifically, in the retracted condition, the projections 124 on the actuating pistons 120 are located at the first ends 140 of the slots 138 in the rotors 130. The projections 124 can abut the radially inner extent of the respective slots 138 or be spaced therefrom.

In any case, in the retracted position, the flanges 100 are pulled in close to the shaft 50 such so as to abut the shaft and one another. Accordingly, the flanges 100 collectively and generally define a cylinder having a first diameter $\Phi_1$ and length L when in the retracted position. The volume $(V_1)$ of the cylinder when the flanges 100 are in the retracted position is therefore defined by the equation:

$$V_1 = \Phi_1 * L$$

Figure 9:
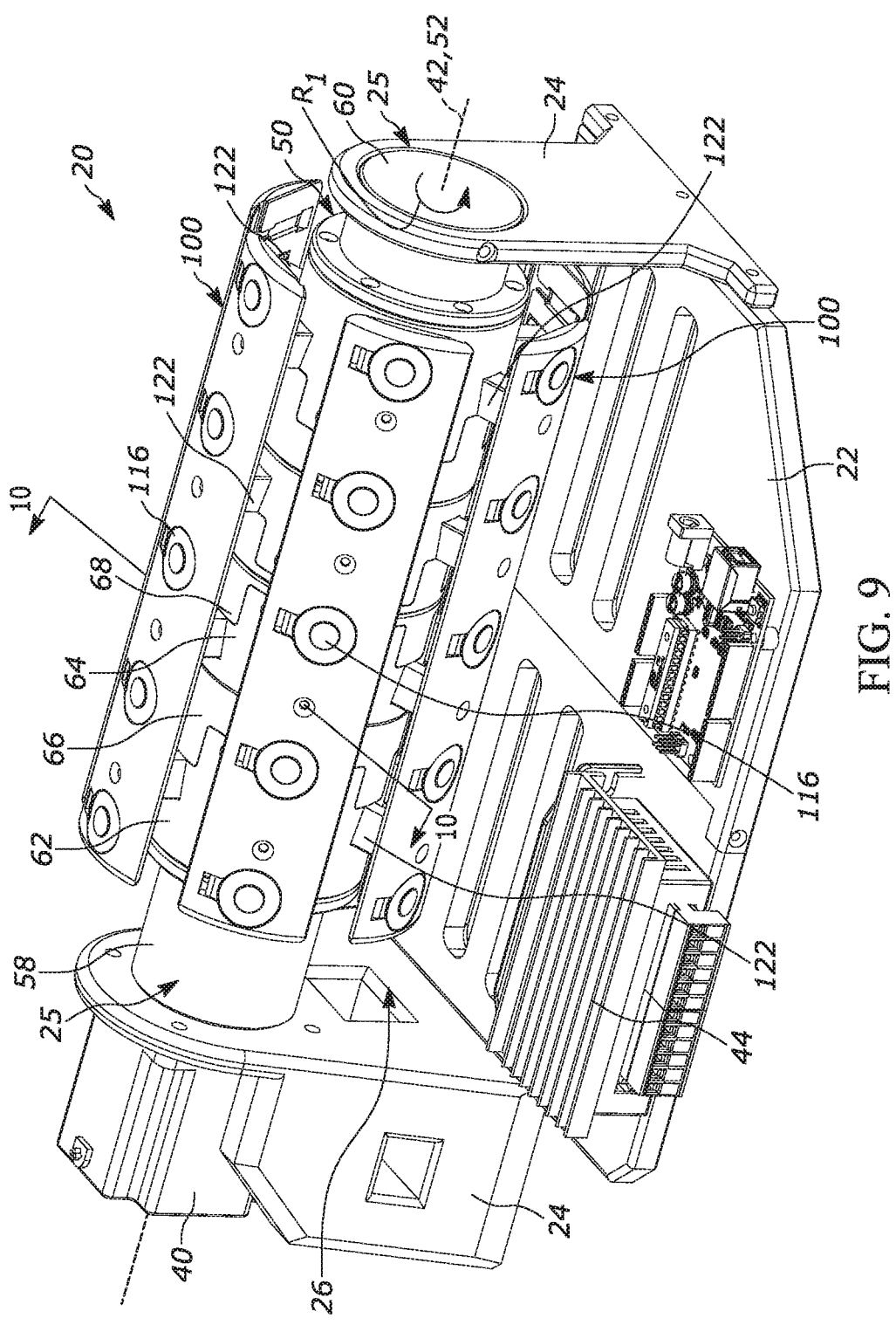
FIG. 9 is a schematic illustration of the apparatus in a second or expanded condition.
Figure 10:
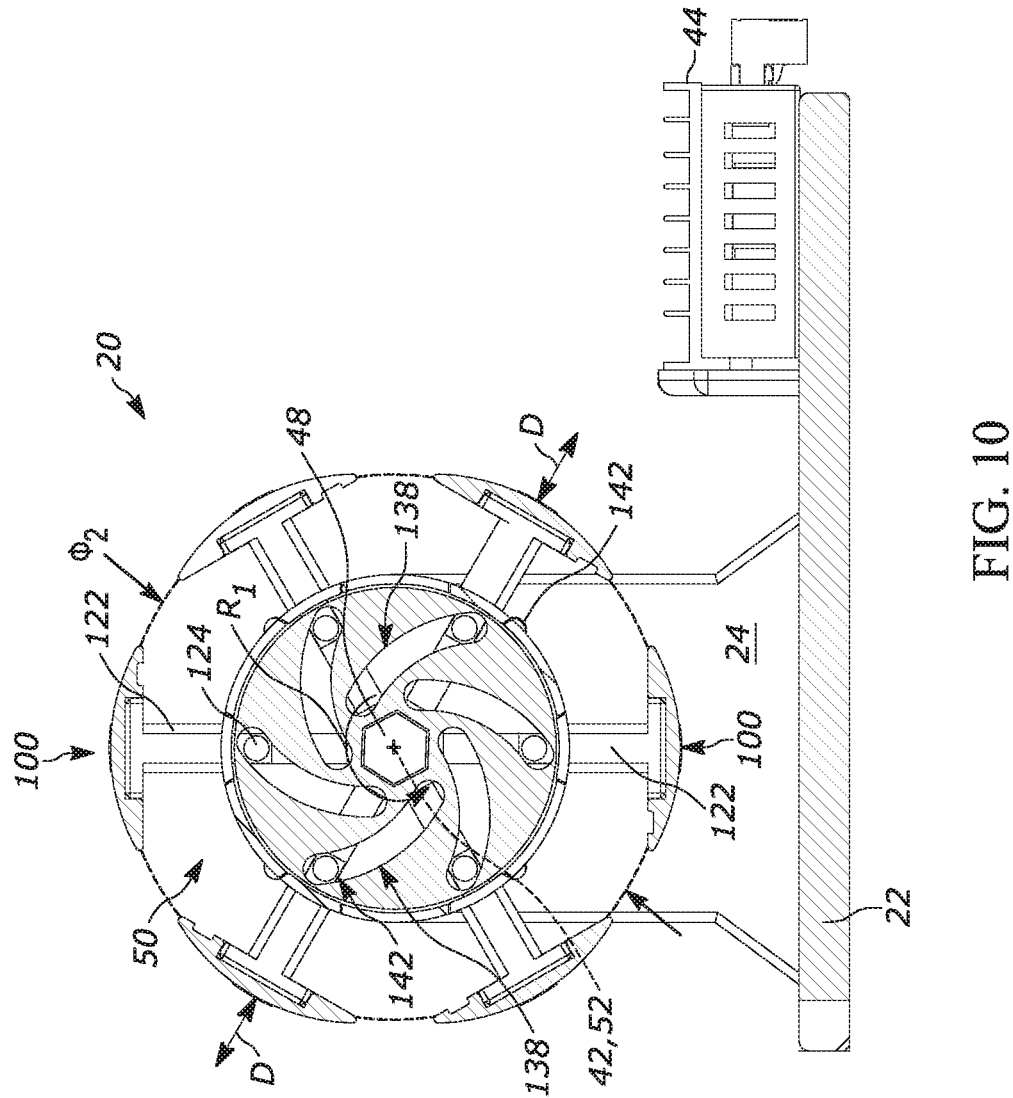
FIG. 10 is a side view of the apparatus of FIG. 9.

The controller 44 can actuate the motor 40 when it is desirable to extend the flanges 100 relative to the shaft 50. To this end, the controller 44 actuates the motor 40 to rotate the rod 48 about the axis 42 in, for example, the counter-clockwise direction $R_1$ which, in turn, rotates the rotors 130 in the direction $R_1$ (FIGS. 9-10). As noted, the projections 124 are provided in the slots 138 and, thus, rotating the rotors 130 in the direction $R_1$ causes the projections to slide along and within the slots from the first end 140 towards the second end 142 due to the trajectory of the slots.

Since the bases 122 of the actuating pistons 120 extend through the radial passages 80 in the shaft 50—which is fixed in place—the bases are prevented from moving about the axis 42. In other words, the bases 122 are confined to sliding movement in the manner D along the radial passages relative to the shaft 50 and rotors 130. Similarly, the projections 124 fixed to the bases 122 are likewise incapable of moving about the axis 42 and confined to radial movement with the bases in the manner D. Consequently, rotating the rotors 130 does not cause the actuating pistons 120 or flanges 100 connected thereto to orbit the axis 42.

With this in mind, as the projections 124 slide within slots 138 towards the second ends 142 thereof, the projections are urged radially outward from the axis 42 towards the periphery of the respective rotor 130. As a result, the bases 122 of the actuating pistons 120 are pushed radially outward from the axis 42, thereby causing the flanges 100 fixed to the bases 122 to move out of engagement with the shaft 50 as well as out of engagement with each other. Radial movement of the actuating pistons 120 and associated flanges 100 is indicated generally at D.

The motor 40 can be rotated until the projections 124 reach the extent of the second ends 142 of the slots 138 as shown in FIG. 10 to place the apparatus 20 in a second or expanded condition coinciding with an extended position of the flanges 100. When the apparatus 20 is placed in the expanded condition, the flanges 100 collectively define a cylinder having a second diameter $\Phi_2$ and length L. The volume ($V_2$) of the cylinder when the flanges 100 or the apparatus 20 is in the expanded condition is therefore defined by the equation:

$$V_2 = \Phi_2 * L$$

It will be appreciated that since the slots 138 define the extent of radial movement of the actuating pistons 120, the slots necessarily define the extent of movement of the flanges 100 in the manner D. In other words, the first end 140 of the slot 138 helps to define the fully retracted position of each flange 100 and, therefore, the fully contracted condition of the apparatus 20. The second end 142 of the slot 138 helps to define the fully extended position of each flange 100 and therefore the fully expanded condition of the apparatus 20.

With this in mind, the ends 140, 142 of the slots 138 and/or the trajectory thereof can be configured to set pre-determined minimum and maximum volumes defined by the flanges 100 when in the fully retracted/extended positions. Alternatively, the slots 138 can be configured such that the flanges 100 abut one another to define a minimum volume while being radially spaced from the shaft 50 (not shown). It will be appreciated, however, that the motor 40 can stop the projections 124 at any point between the ends 140, 142 of the slots 138 and thereby place the flanges 100 at any position between the fully retracted and fully extended positions.

When the actuator is configured as a step motor, the motor 40 is capable of precisely moving the flanges 100 into any position between the fully retracted and fully extended positions. In other words, the step motor 40 can rotate the rotors 130 to position the projections 124 in precise positions with the slots 138 and between the ends 140, 142 thereof. The motor 40 is configured to prevent back drive such that deactuating the motor locks the rod 48 in place. This thereby locks the rotors 130 in position, which consequently locks the flanges 100 in place.

When it is desirable to return the flanges 100 to the retracted position, the controller 44 actuates the motor 40 to rotate in a direction $R_2$ (clockwise as shown in FIG. 2) opposite the direction $R_1$. Rotation of the motor 40 in the direction $R_2$ causes the rotors 130 to rotate in the direction $R_2$. This causes the rotors 130 to pull the projections 124 radially inwards towards the axis 42, thereby likewise pulling the bases 122 and flanges 100 fixed thereto radially inward towards the axis 42 in the manner D.

The projections 124 therefore slide within and relative to the slots 138 from the second end 142 towards the first end 140. The bases 122 slide within and relative to the radial passages 80 in the shaft 50. The motor 40 can be actuated to rotate the rotors 130 in the direction $R_2$ until the flanges 100 return to the fully retracted position, in which case the apparatus 20 is in the fully contracted condition.

It will be appreciated that the motor 40 can be cyclically actuated between rotation in the direction $R_1$ and the direction $R_2$. This cyclical actuation causes the flanges 100 to cyclically move in the radially outward and radially inward direction in the manner D. Consequently, the volume defined by the flanges 100 cycles between the volume $V_1$ and the volume $V_2$. As noted, the flanges 100 can be moved to any position between the fully extended and fully retracted positions and, thus, the flanges can be cycled between any radial position between (and including) the fully extended and fully retracted positions depending on the application.

The apparatus 20 of the present invention is advantageous in allowing for the testing of, for example, wearables and implants. This can include, for example, shielding textiles such as body protective equipment or body armor; supportive wearables to augment physical function in work, remote (including space) environments for rescue applications; compression sleeves for post-surgical wounds, burns, deep vein thrombosis prevention and treatment, varicose veins, etc.; and/or medical devices such as stents. To this end, the apparatus 20 can help test and produce sleeves for burns and wound therapy, the prevention and treatment of deep vein thrombosis, and/or sleeves for sports and rehabilitation medicine.

The apparatus can also be configured as a physiotherapy device, e.g., a system for actuating a physiotherapy ball to impart spatiotemporally varying displacements on the surface of a sphere or body that imparts a massage effect on the surface of the skin when a person places it between the skin and a surface. The surface can be, for example, a wall, floor or a hand.

For example, a compression sleeve can be positioned over the flanges 100 when the flanges are in the fully retracted condition. The controller 44 can then actuate the motor 40 radially extend the flanges 100 and thereby increase the volume defined thereby. The expanding apparatus 20 thereby expands the compression sleeve against the natural/tensile resistance built into the sleeve.

In this context, extension of the flanges simulates fluid build-up or oedema in an appendage, e.g., arm or leg. That said, the flanges can be extended to a desired volume and/or cycled between volumes in order to assess the performance of the compression sleeve. By mimicking real life expansion/contraction of the limb receiving the compression sleeve. To this end, the pressure sensors arranged along the flanges can monitor forces applied by the compression sleeve to the flanges as the apparatus is expanded and contracted. This data can be used to confirm or modify the construction of the compression sleeve.

Figure 11:
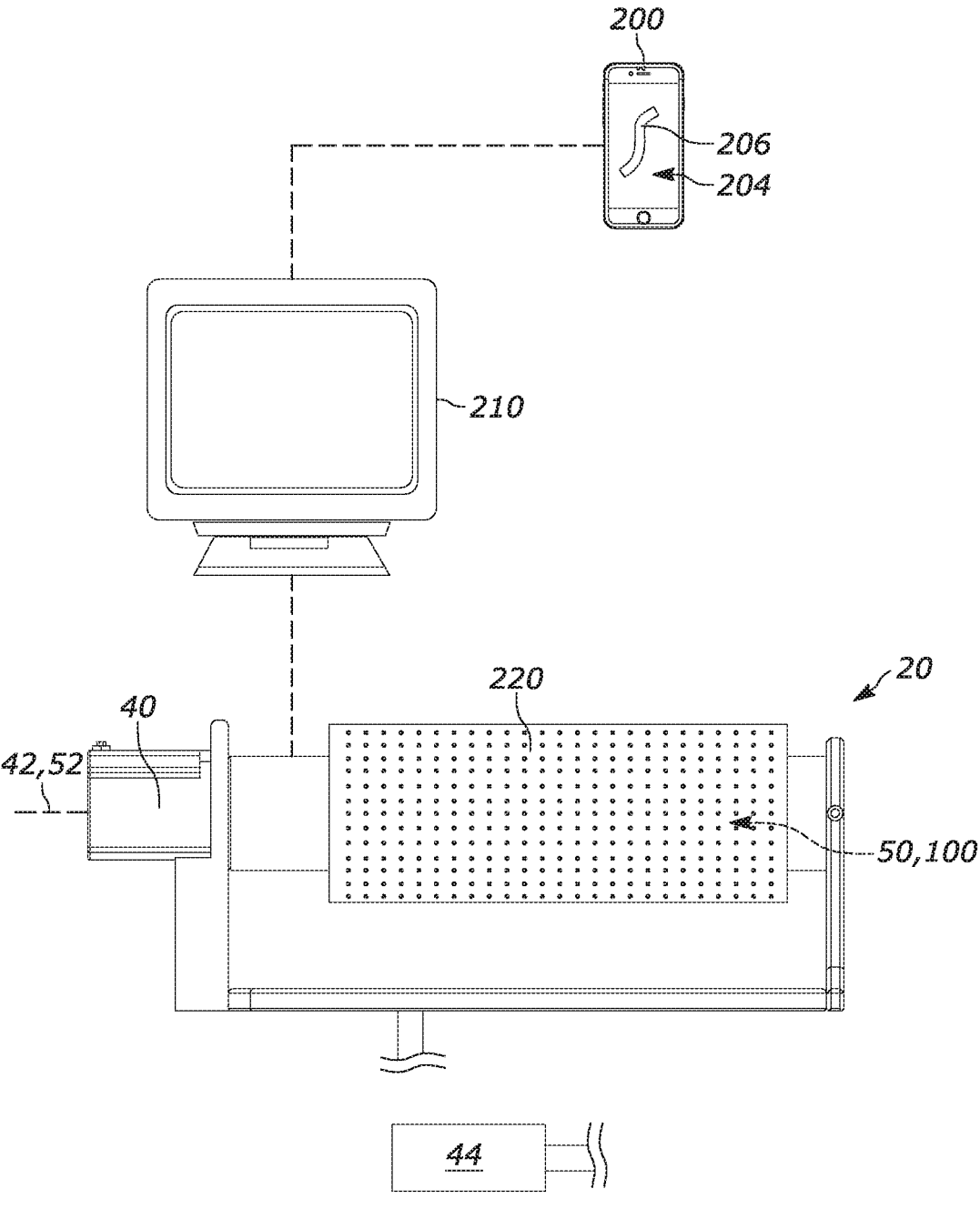
FIG. 11 is a schematic illustration of a system for use with the apparatus.

The apparatus shown and described herein can be used in a system (see FIG. 11) that includes a mobile device and/or mobile application in order to efficiently size a patient for a compression garment using digital means and remotely. To this end, and referring to FIG. 11, the subject/patient can use a mobile device 200, e.g., phone, tablet or the like, to download an app that allows the patient to take one or more images 204 of an appendage or limb 206 to receive a compression garment. The image data can then be sent wirelessly to a computer or mobile device 210 accessible by the medical provider. From the image 204 data, the medical provider can remotely determine physical measurements of the limb 206.

Based on the measurements, morphometric analysis can be simulated/performed in order to generate the size, shape, and material(s) for a compression garment 220. The compression garment 220 can then be produced by, for example, 3D printing and placed on the apparatus 20 of the present invention for testing. The sensors 116 provided on the apparatus 20 can provide real-time feedback regarding the force distribution on the compression garment 220 as the flanges 100 are extended and/or retracted.

It will also be appreciated that based on the data 204 and any analysis performed thereon, the contour/shape of the flanges 100 can also be adjusted to more accurately reflect the shape of the limb 206. In other words, the flanges 100 may generally define a cylindrical volume but will more precisely define a 3D volume mimicking the subject limb 206 and capable of expansion and contraction to mimic expansion/contraction of the limb.

In response to testing the compression garment 220, the dimensions and/or materials thereof can then be adjusted, the modified compression garment tested again, and the cycle repeated (if necessary) until a desirable compression garment is produced. The selected compression garment 220 can then be sent to the patient for use. A follow-up, remote interaction between the patient and the medical provider can determine if any additional adjustments or modifications to the compression garment 220 need to be made.

That said, it is clear that the apparatus shown and described herein can cooperate with a mobile device or other computing devices to help provide so-called "connected health" and/or "telehealth" services and solutions to patients in an efficient manner that can be modified and/or scaled to meet the particular application, patient needs, etc.

Example

In this example, an apparatus in accordance with the present invention was tested. The motor was a step motor providing a torque output of 9 kg/cm and having a resolution of 200 steps per revolution. The sensors had a sensing area of 14.5 mm and a pressure range of 20 g-6 kg. Digital Image Correlation (DIC) using a computer vision and a single camera to track displacement of a grid marked on the sleeve was used in conjunction with the sensors. A compression sleeve was placed over the flanges and the motor actuated incrementally to sequentially increase the volume defined by the flanges over time.

Figure 12:
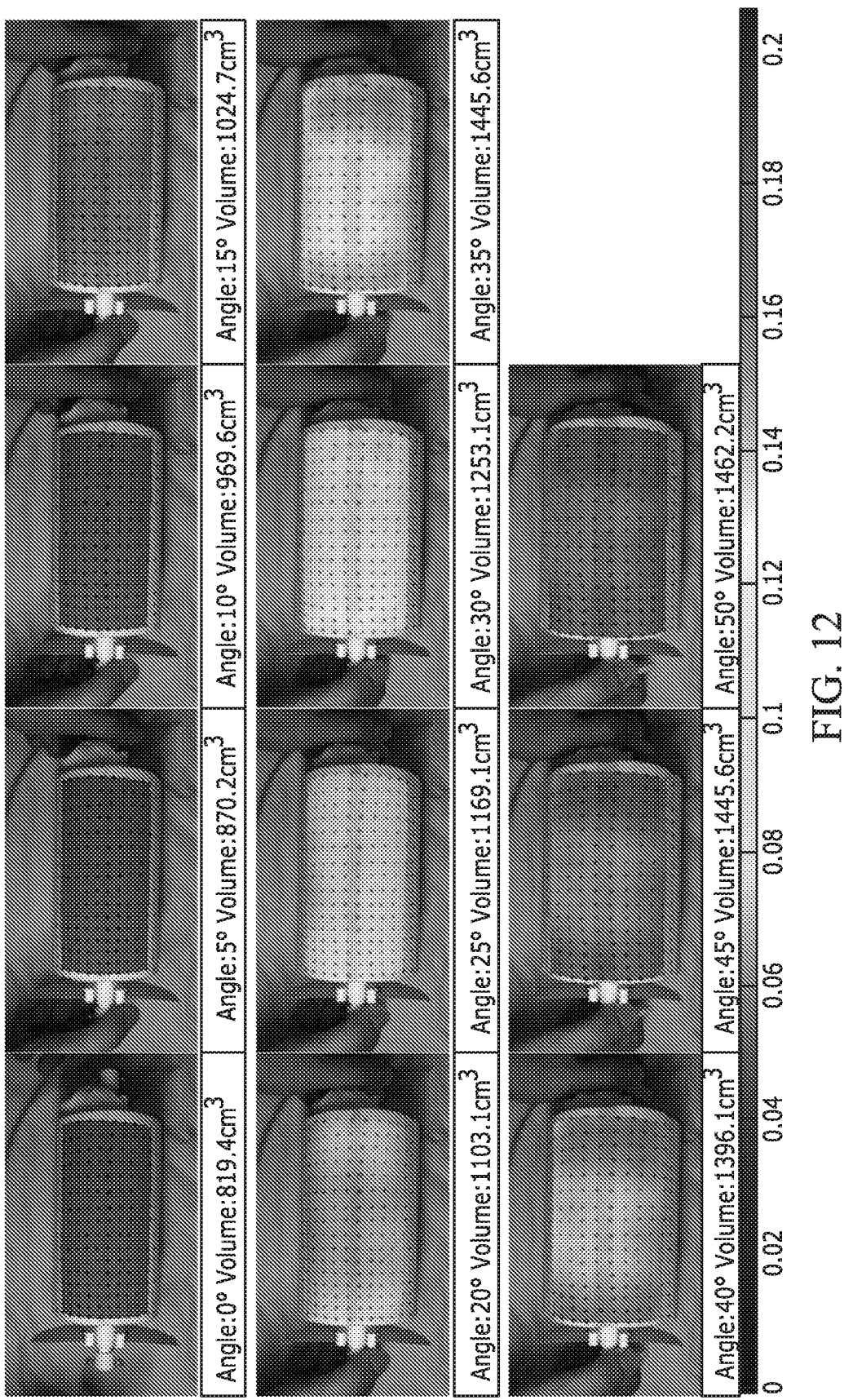
FIG. 12 is a series of images illustrating testing of the apparatus over various motor actuation states.
Figure 13A:
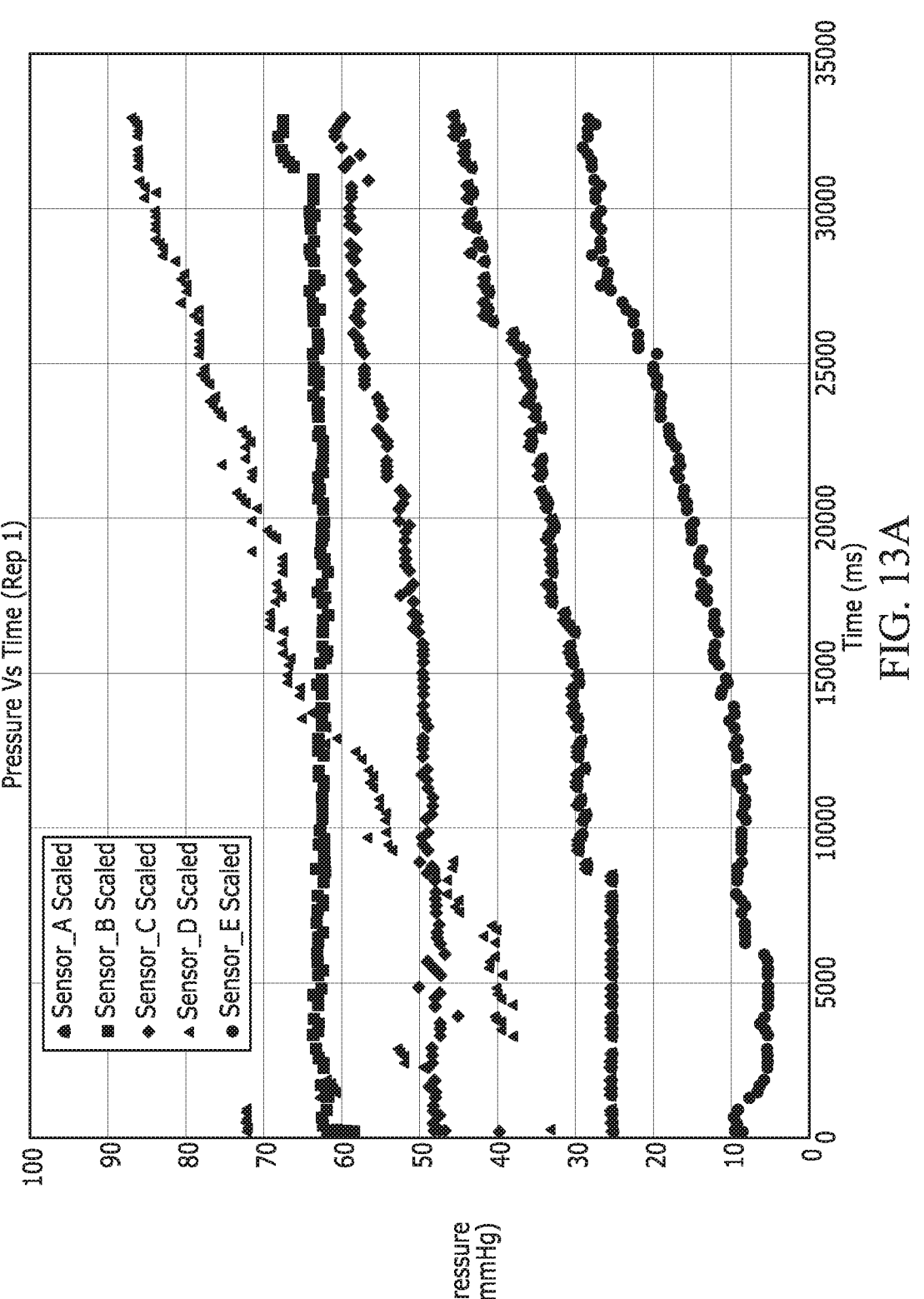
FIGS. 13A-13C are graphs indicating pressure sensor data obtained during the testing.
Figure 13B:
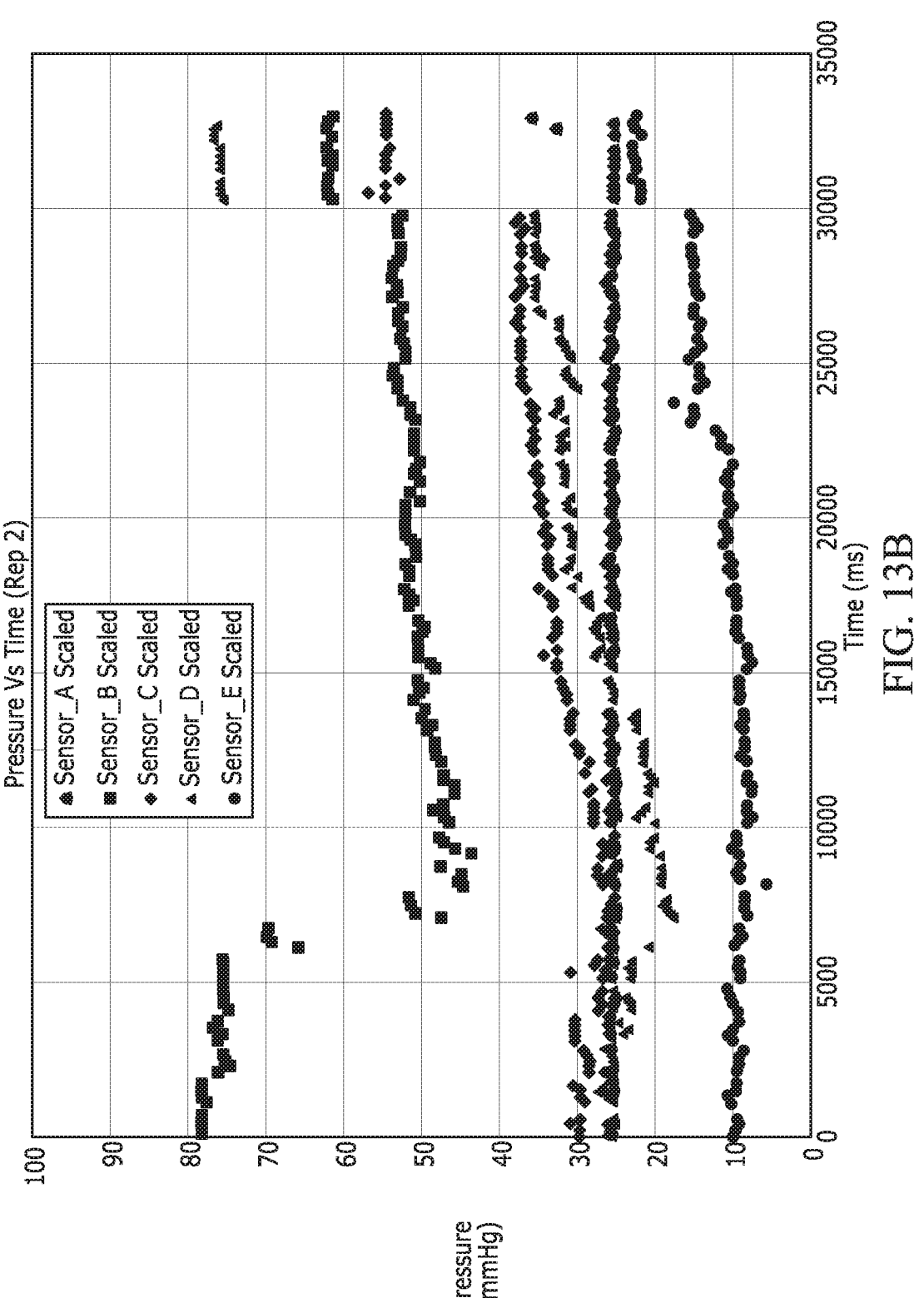
Figure 13C:
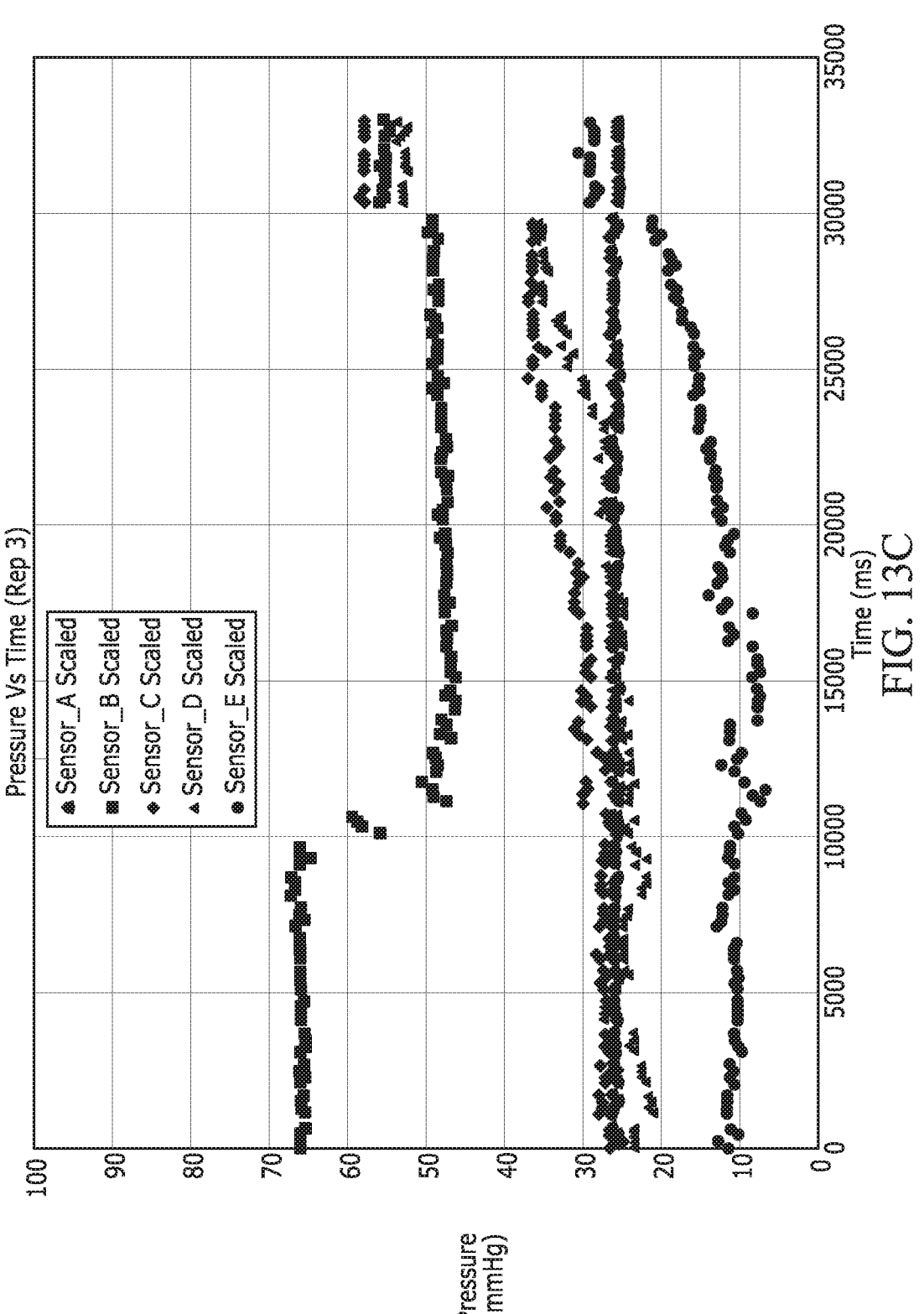
Figure 14:
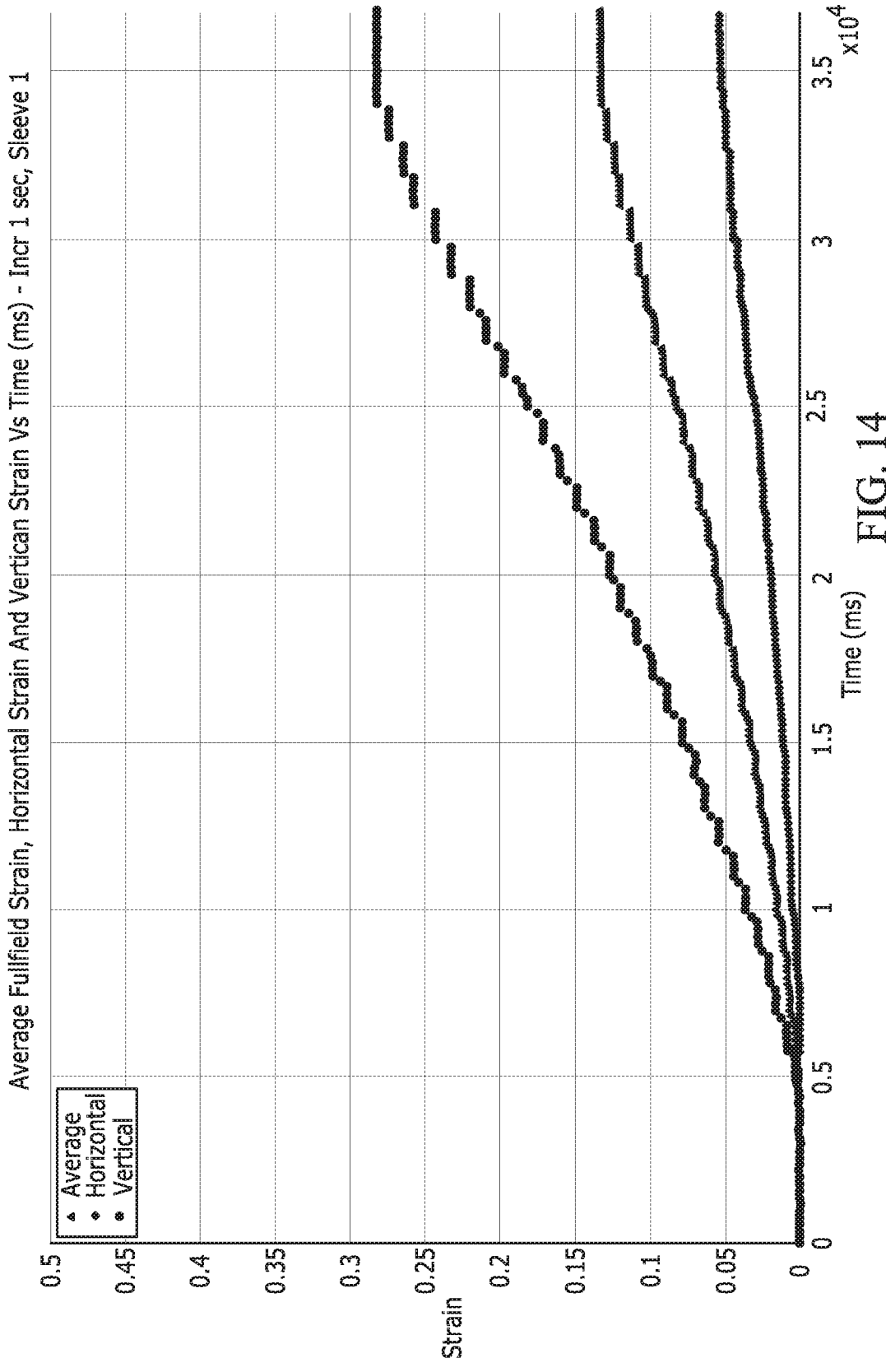
FIG. 14 is a graph illustrating strain data obtained during the testing.

Images taken at various points in the expansion of the compression sleeve on the apparatus are shown in FIG. 12 and indicate spatial strain maps using DIC. Pressure sensor data was also taken as the motor actuation angle incrementally increased 1.8 degrees 33 times, with 1 second between intervals. The pressure data recorded by the sensors over three for different iterations of the test is shown in FIGS. 13A-13C. FIG. 14 graphically illustrates the DIC data obtained during the testing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for simulating a body part, comprising:
   a base;
   an actuator connected to the base;
   rotors rotatable about an axis in response to actuation of the actuator, each rotor including radially extending slots; and
   flanges circumferentially arranged about the rotor, each flange including actuating pistons slidably received in the slots of the rotors such that the flanges are moved radially relative to the axis in response to actuation of the actuator to vary a volume defined by the flanges and thereby simulate body part expansion and contraction.

2. The apparatus of claim 1, the slots extending radially and circumferentially relative to the axis.

3. The apparatus of claim 1, each of the actuating pistons comprising a base and a projection extending from the base and slidably received in one of the slots.

4. The apparatus of claim 3, further comprising a shaft rigidly connected to the base and including radially extending passages for slidably receiving the bases of the actuating pistons to prevent circumferential movement of the actuating pistons about the axis during rotation of the rotors.

5. The apparatus of claim 4, rotation of the rotors causing the projections to slide within the slots and the actuating pistons to slide within the passages to adjust the volume defined by the flanges.

6. The apparatus of claim 4, rotation of the rotors causing the projections to slide within the slots radially outward from the axis to thereby move the flanges radially outward from the axis.

7. The apparatus of claim 1, further comprising at least one pressure sensor provided on each flange and configured to measure force exerted on the flanges by a compression sleeve extending over the flanges.

8. The apparatus of claim 7, the at least one pressure sensor comprising multiple pressure sensors longitudinally aligned with one another along each flange.

9. The apparatus of claim 1, the flanges being configured to receive an expandable stent.

10. The apparatus of claim 1, the flange being configured to receive a compression sleeve.

11. The apparatus of claim 1, the flanges being configured to receive body armor.

12. The apparatus of claim 1, the actuator comprising a motor.

13. An apparatus for simulating a body part, comprising:
   a base;

a motor connected to the base;

rotors rotatable about an axis in response to rotation of the motor, each rotor including radially extending slots;

a shaft extending over the rotors and connected to the base to prevent movement of the shaft relative to the rotors, the shaft including radially extending passages;

flanges circumferentially arranged around the shaft, each flange including actuating pistons extending through the passages in the shaft and slidably received in the slots of the rotors, rotation of the motor causing rotation of the rotors to move the actuating pistons through the slots to thereby vary a volume defined by the flanges and simulate body part expansion and contraction.

14. The apparatus of claim 13, the slots extending radially and circumferentially relative to the axis.

15. The apparatus of claim 13, each of the actuating pistons comprising a base having a head fixed to the flange and a projection extending from the base and slidably received in one of the slots.

16. The apparatus of claim 13, the shaft receiving the actuating pistons to prevent circumferential movement of the flanges about the axis during rotation of the rotors.

17. The apparatus of claim 13, rotation of rotors causing the actuating pistons to slide within the passages while the projections slide within the slots.

18. The apparatus of claim 13, further comprising at least one pressure sensor provided on each flange and configured to measure force exerted on the flanges by a compression sleeve extending over the flanges.

19. The apparatus of claim 18, the at least one pressure sensor comprising multiple pressure sensors longitudinally aligned with one another along each flange.

20. The apparatus of claim 13, the flanges being configured to receive an expandable stent.

21. The apparatus of claim 13, the flange being configured to receive a compression sleeve.

22. The apparatus of claim 13, the flanges being configured to receive body armor.

\* \* \* \* \*